US011554629B2

(12) United States Patent
Liao et al.

(10) Patent No.: US 11,554,629 B2
(45) Date of Patent: Jan. 17, 2023

(54) HYBRID POWER CONVERSION SYSTEM FOR A REFRIGERATED TRANSPORT VEHICLE AND METHOD

(71) Applicant: Carrier Corporation, Palm Beach Gardens, FL (US)

(72) Inventors: XuQiang Liao, Manlius, NY (US); Garrison S. Moseley, Liverpool, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 286 days.

(21) Appl. No.: 16/619,635

(22) PCT Filed: May 21, 2018

(86) PCT No.: PCT/US2018/033640
§ 371 (c)(1),
(2) Date: Dec. 5, 2019

(87) PCT Pub. No.: WO2018/226389
PCT Pub. Date: Dec. 13, 2018

(65) Prior Publication Data
US 2020/0198519 A1    Jun. 25, 2020

Related U.S. Application Data

(60) Provisional application No. 62/516,394, filed on Jun. 7, 2017.

(51) Int. Cl.
*B60H 1/00* (2006.01)
*B60H 1/32* (2006.01)
*B60P 3/20* (2006.01)

(52) U.S. Cl.
CPC ........... *B60H 1/00428* (2013.01); *B60H 1/00* (2013.01); *B60H 1/0045* (2013.01);
(Continued)

(58) Field of Classification Search
CPC .... B60H 1/00428; B60H 1/00; B60H 1/0045; B60H 1/3208; B60H 1/3222; B60H 1/3232; B60H 1/004; F25D 11/003; B60P 3/20
See application file for complete search history.

(56) References Cited

U.S. PATENT DOCUMENTS 7,151,326 B2    12/2006   Jordan
7,673,466 B2     3/2010   Pacy
(Continued)

FOREIGN PATENT DOCUMENTS

CN    203589774 U     5/2014
EP      2528759 B1   11/2014
(Continued)

OTHER PUBLICATIONS

International Search Report and Written Opinion for application PCT/US2018/033640, dated Aug. 29, 2018, 16 pages.
(Continued)

*Primary Examiner* — Elizabeth J Martin
(74) *Attorney, Agent, or Firm* — Cantor Colburn LLP

(57) ABSTRACT

A hybrid power conversion system (60) for an air conditioned transport vehicle (24) including a plurality of refrigeration components (52, 54, 56) for heating and/or cooling a refrigerated volume (40). Also included is a battery (62) storing electrical power to be provided to at least one of the plurality of refrigeration components (52, 54, 56). Further included is at least one supplemental power source (68, 70, 72, 76) providing electrical power to the battery (62) to provide a total available DC power for the refrigeration components (52, 54, 56). Yet further included is a power converter (64) converting the total available DC power to a total AC power, the total AC power provided to at least one of the plurality of refrigeration components (52, 54, 56).

12 Claims, 2 Drawing Sheets

(52) U.S. Cl.
CPC ......... *B60H 1/3208* (2013.01); *B60H 1/3222* (2013.01); *B60H 1/3232* (2013.01); *B60P 3/20* (2013.01)

(56) References Cited

U.S. PATENT DOCUMENTS

| | | | |
|---|---|---|---|
| 7,878,013 | B2 | 2/2011 | Matsuno et al. |
| 8,193,660 | B2 | 6/2012 | Rockenfeller et al. |
| 8,295,950 | B1 * | 10/2012 | Wordsworth ........... B60L 1/003 700/22 |
| 8,347,999 | B2 | 1/2013 | Koelsch et al. |
| 9,126,544 | B2 | 9/2015 | Larson et al. |
| 9,228,750 | B2 | 1/2016 | Rockenfeller et al. |
| 9,440,525 | B1 * | 9/2016 | Baty ................... B60H 1/00014 |
| 9,586,458 | B2 | 3/2017 | Larson et al. |
| 2003/0019231 | A1 * | 1/2003 | Wessells ............ B60H 1/00428 62/239 |
| 2006/0071554 | A1 | 4/2006 | McNamara et al. |
| 2007/0221370 | A1 | 9/2007 | Allen et al. |
| 2010/0154449 | A1 | 6/2010 | Stover, Jr. et al. |
| 2010/0229581 | A1 | 9/2010 | Truckenbrod et al. |
| 2011/0018349 | A1 | 1/2011 | Rockenfeller et al. |
| 2013/0000342 | A1 | 1/2013 | Blasko et al. |
| 2013/0118196 | A1 | 5/2013 | Chen et al. |
| 2014/0020411 | A1 | 1/2014 | Li |
| 2014/0060097 | A1 * | 3/2014 | Perreault .............. B60H 1/3232 62/133 |
| 2014/0208795 | A1 * | 7/2014 | Bell ........................ F25D 11/00 62/419 |
| 2015/0121923 | A1 * | 5/2015 | Rusignuolo ........... F25D 11/003 62/428 |
| 2015/0244306 | A1 * | 8/2015 | Estes ........................ H02S 40/32 700/287 |
| 2016/0297384 | A1 | 10/2016 | Guo |
| 2018/0029436 | A1 | 2/2018 | Zaeri et al. |
| 2021/0197645 | A1 * | 7/2021 | Larson ................. B60H 1/3232 |

FOREIGN PATENT DOCUMENTS

| | | |
|---|---|---|
| WO | 2009099429 A1 | 8/2009 |
| WO | 2018005988 A1 | 1/2018 |

OTHER PUBLICATIONS

Shore Power, "Shore power capable Auxiliary Power Units (APUs)", availabe at: https://www.shorepower.com/docs/Shorepower-capable-APUs.pdf, accessed Dec. 5, 2019, 6 pages.

European Opposition for Application No. 3634792; dated Jul. 21, 2022; 8 Pages.

* cited by examiner

HYBRID POWER CONVERSION SYSTEM FOR A REFRIGERATED TRANSPORT VEHICLE AND METHOD

BACKGROUND

Exemplary embodiments pertain to refrigerated transport vehicles and, more particularly, to a hybrid power conversion system for a refrigerated transport vehicle.

Transport refrigeration unit (TRU) systems are employed to condition one or more compartments within a trailer. The compartment(s) is used to contain perishable products that are to be maintained at or proximate a desired temperature during storage and/or transportation of the trailer. The TRU typically requires an engine to power one or more refrigeration components, such as a compressor. The engine requires fuel during operation. Pending or existing regulations in certain regions may restrict where diesel engines may be operated and impose fuel consumption restrictions. Therefore, alternative power sources for TRU systems may be beneficial.

BRIEF SUMMARY

Disclosed is a hybrid power conversion system for an air conditioned transport vehicle including a plurality of refrigeration components for heating and/or cooling a refrigerated volume. Also included is a battery storing electrical power to be provided to at least one of the plurality of refrigeration components. Further included is at least one supplemental power source providing electrical power to the battery to provide a total available DC power for the refrigeration components. Yet further included is a power converter converting the total available DC power to a total AC power, the total AC power provided to at least one of the plurality of refrigeration components.

In addition to one or more of the features described above, or as an alternative, further embodiments may include that the at least one supplemental power source comprises a solar panel.

In addition to one or more of the features described above, or as an alternative, further embodiments may include that the at least one supplemental power source comprises at least one of a regenerative braking system and a wheel hub generator system.

In addition to one or more of the features described above, or as an alternative, further embodiments may include that the at least one supplemental power source comprises a fuel cell pack.

In addition to one or more of the features described above, or as an alternative, further embodiments may include that the at least one supplemental power source comprises a generator operatively coupled to an engine of a tractor towing the refrigerated transport vehicle.

In addition to one or more of the features described above, or as an alternative, further embodiments may include that the power converter comprises at least one of a power inverter, a motor drive and a motor controller.

Also disclosed is a hybrid power conversion system for an air conditioned transport vehicle including a plurality of refrigeration components for heating and/or cooling a refrigerated volume. Also included is a battery storing electrical power to be provided to at least one of the plurality of refrigeration components. Further included is a refrigeration system engine operatively coupled to a generator to provide electrical power to the battery, the electrical power from the battery and the generator providing a total available DC power for the refrigeration components. Yet further included is a power converter converting the total available DC power to a total AC power, the total AC power provided to at least one of the plurality of refrigeration components.

In addition to one or more of the features described above, or as an alternative, further embodiments may include at least one supplemental power source providing electrical power to the battery to provide supplemental power for the refrigeration components, the total available DC power comprising a combination of the electrical power provided by the battery, the at least one supplemental power source and the generator.

In addition to one or more of the features described above, or as an alternative, further embodiments may include that the at least one supplemental power source comprises a solar panel.

In addition to one or more of the features described above, or as an alternative, further embodiments may include that the at least one supplemental power source comprises at least one of a regenerative braking system and a wheel hub generator system.

In addition to one or more of the features described above, or as an alternative, further embodiments may include that the at least one supplemental power source comprises a fuel cell pack.

In addition to one or more of the features described above, or as an alternative, further embodiments may include that the at least one supplemental power source comprises a generator operatively coupled to an engine of a tractor towing the refrigerated transport vehicle.

In addition to one or more of the features described above, or as an alternative, further embodiments may include that the power converter comprises at least one of a power inverter, a motor drive and a motor controller.

In addition to one or more of the features described above, or as an alternative, further embodiments may include a controller in operative communication with the battery, the power converter and the refrigeration system engine generator to determine if the power required by the plurality of refrigeration requires the supplemental power available from the refrigeration system engine generator.

In addition to one or more of the features described above, or as an alternative, further embodiments may include that the refrigeration system engine is non-operational if the power required by the plurality of refrigeration components does not require the supplemental power provided by the refrigeration system engine generator.

In addition to one or more of the features described above, or as an alternative, further embodiments may include that the refrigeration system engine is disposed within a refrigeration system housing mounted proximate an outer surface of the refrigerated transport vehicle.

Further disclosed is a method of operating an air conditioned system of a transport vehicle. The method includes providing electrical power to at least one of a plurality of refrigeration components with a battery, the battery configured to output a total DC power. The method also includes providing supplemental electrical power with a generator operatively coupled to a refrigeration system engine, the electrical power provided by the generator routed to the battery to be part of the total DC power. The method further includes converting the total DC power to a total AC power. The method yet further includes routing the total AC power to the at least one refrigeration component. The method also includes determining if the power required by the plurality of refrigeration requires the supplemental power available from the refrigeration system engine generator. The method further includes switching the refrigeration system engine to a non-operational condition if the power required by the plurality of refrigeration components does not require the supplemental power provided by the refrigeration system engine generator.

In addition to one or more of the features described above, or as an alternative, further embodiments may include providing additional supplemental power to the battery with at least one supplemental power source.

In addition to one or more of the features described above, or as an alternative, further embodiments may include that the at least one supplemental power source comprises at least one of a solar panel, a regenerative braking system, a wheel hub generator, a fuel cell pack and a generator operatively coupled to an engine of a tractor towing the refrigerated transport vehicle.

In addition to one or more of the features described above, or as an alternative, further embodiments may include that the at least one supplemental power source is the wheel hub generator. The method further includes determining the condition to enable or disable the wheel hub generator. The method yet further includes determining the condition to use the wheel hub generator to assist vehicle braking.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
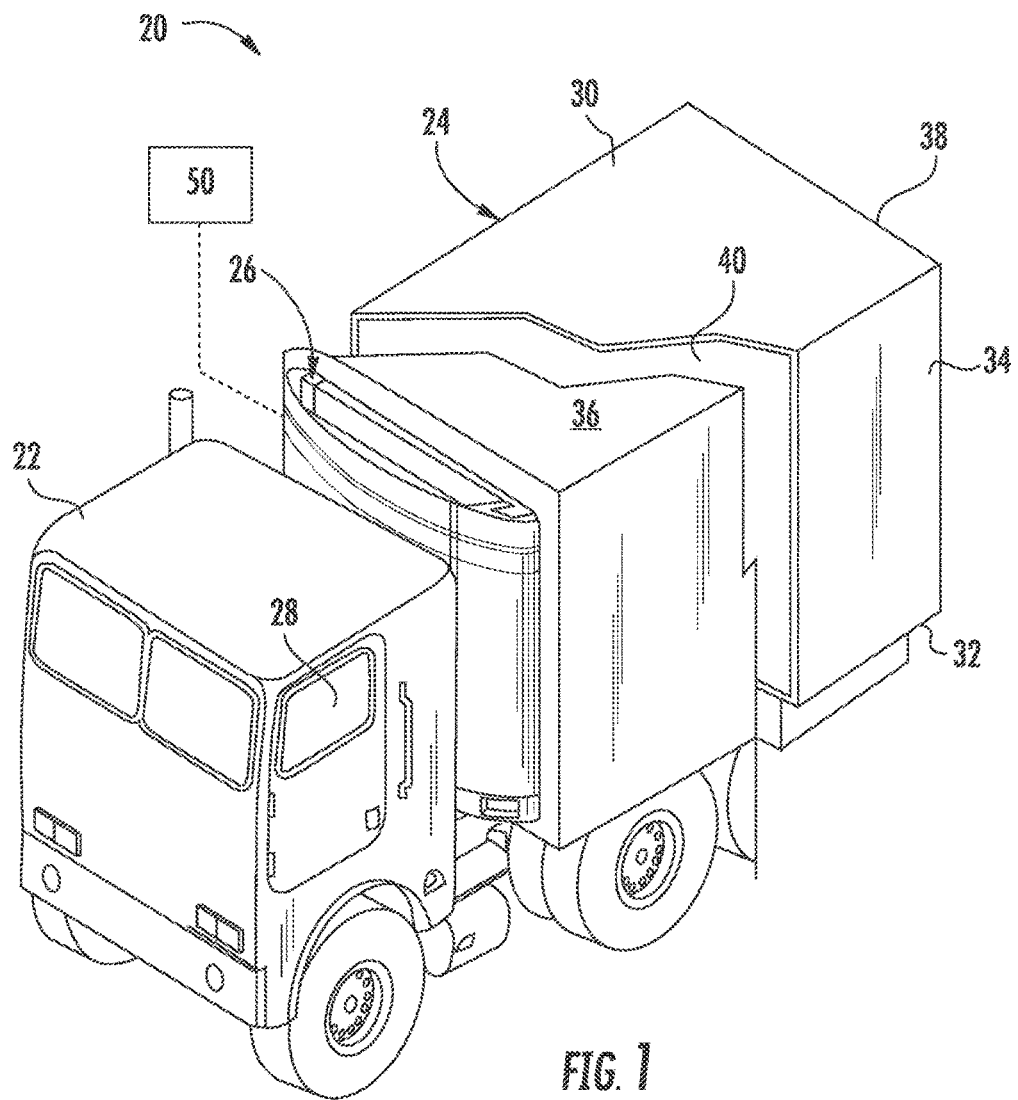
FIG. 1 is a perspective view of a refrigerated tractor trailer system.

FIG. 1 illustrates a tractor trailer system 20. The tractor trailer system 20 includes a tractor or truck 22, a trailer 24 and a transport refrigeration unit ("TRU") 26. The trailer 24 is also referred to herein as a refrigerated transport vehicle. The tractor 22 includes an operator's compartment or cab 28. The trailer 24 is operatively coupled to the tractor 22 and is thus pulled or propelled to desired destinations. The trailer 24 includes a top wall 30, a bottom wall 32 opposed to and spaced from the top wall 30, two side walls 34 spaced from and opposed to each another, and opposing front and rear walls 36, 38. The walls 30, 32, 34, 36, 38 together define boundaries of a cargo compartment 40. It is contemplated and understood that the cargo compartment 40 may also be divided into two or more smaller compartments for different temperature cargo requirements. Although the TRU 26 and the associated embodiments described herein are disclosed in the context of a trailer, it is to be understood that a refrigerated truck may benefit from the embodiments disclosed herein.

The trailer 24 is generally constructed to store cargo (not shown) in the compartment 40. The TRU 26 is generally integrated into the trailer 24 and is mounted to the front wall 36 in some embodiments, such as the illustrated embodiment. The cargo is maintained at a desired temperature by heating and/or cooling of the compartment 40 via the TRU 26 that circulates air into and through the cargo compartment 40 of the trailer 24. It is further contemplated and understood that the TRU 26 may be applied to any transport container and not necessarily those used in tractor trailer systems. Furthermore, the transport container may be a part of the trailer 24 and constructed to be removed from a framework and wheels (not shown) of the trailer 24 for alternative shipping means (e.g., marine, rail, flight, and others).

The TRU 26 may be an all-electric TRU 26, and includes several components that facilitate the desired heating and/or cooling operation of the compartment 40. Such components may include, but are not limited to, a compressor, an electric compressor motor, a condenser heat exchanger that may be air cooled, a condenser fan assembly, a receiver, a filter dryer, a heat exchanger, a thermostatic expansion valve, an evaporator heat exchanger, an evaporator fan assembly, a suction modulation valve, and a controller 50 that may include a computer-based processor (e.g., microprocessor). For illustrative purposes, the controller 50, a compressor 52, a condenser fan 54, an evaporator fan 56, and a refrigeration system engine 58 are illustrated in FIG. 2.

Figure 2:
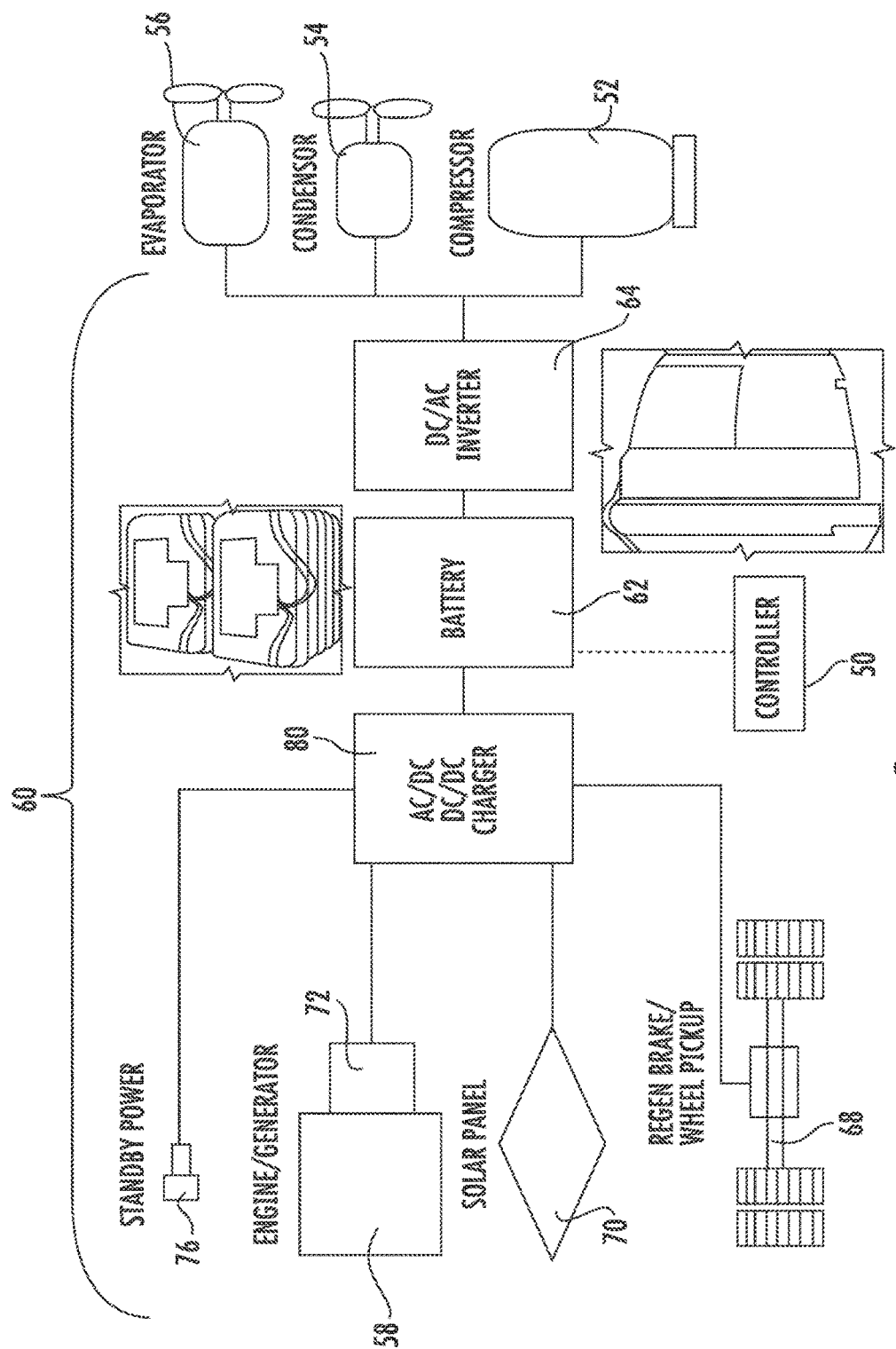
FIG. 2 is a schematic illustration of a hybrid power conversion system for a refrigerated transport vehicle.

Referring now to FIG. 2, a hybrid power conversion system 60 is illustrated. The hybrid power conversion system 60 includes various components that collectively power at least one refrigeration component, the refrigeration component(s) including the compressor 52, the condenser fan 54 and the evaporator fan 56. The power scheme disclosed herein powers the component(s) in a more efficient manner that relies less upon, or eliminates, a refrigeration system engine/motor to reduce fuel consumption otherwise required to power the refrigeration system engine.

As shown, the plurality of refrigeration components 52, 54, and 56 are powered by a battery 62. In some embodiments, a DC-to-AC power inverter 64 is provided to invert the DC output of the battery 62 to an AC output for the plurality of refrigeration components. If the motor is an induction motor, the inverter is provided 64. If the motor is a permanent magnetic type, the inverter 64 may be referred to as a motor drive or a motor controller. In some cases, the motor drive/controller is integrated with the motor itself and DC may be supplied to the motor directly. The motor drive/controller and the power inverter may be referred to generically as a power converter herein. The battery 62 maintains an electrical power capability and is supplemented with electrical power that is sourced from at least one supplemental power source. The at least one supplemental power source may be power generated by a regenerative brake assembly 68 that is part of a wheel assembly of the tractor 22 and/or trailer 24. Additionally, or alternatively, a wheel hub generator that generates electric power when a wheel is turning may be utilized. The supplemental power source may be power generated by a solar panel structure 70 mounted to an exterior surface of the tractor 22 and/or trailer 24. The supplemental power source may be power harnessed by a generator 72 operatively coupled to the refrigeration system engine 58 or a separate generator operatively coupled to an engine of the tractor 22. Additionally, a standby power storing source 76 may be a supplemental power source. In addition to the illustrated supplemental power sources, it is contemplated that any additional type of power sources may be employed, such as a fuel cell pack for example. These are merely examples and it is to be appreciated that various other power sources may be provided.

At least one, but typically a plurality of the above-described power sources forms the combined supplemental power available for routing to the battery 62. Some supplemental power sources more conveniently output DC power, while some output AC power. To combine the electrical power provided by the supplemental power sources for charging of the battery 62, a charger 80 that the battery 62 is electrically coupled with provides a combined DC output that is available for the battery 62. The electrical power provided to the battery 62, combined with that stored therein, results in a total available DC power for the refrigeration components, subsequent to conversion of the DC power output to a useable AC power output.

As described above, some embodiments include the refrigeration system engine 58. In such embodiments, the hybrid power conversion system 60 is configured to rely on electrical power from the battery 62 as much as possible, rather than the refrigeration system engine 58. This reduces the amount of fuel required by the refrigeration system engine 58. This is facilitated by the controller 50 which is in operative communication with various components of the hybrid power conversion system 60. Communication may be present between the controller 50 and the supplemental power sources, the battery 62, the power inverter 64 and/or at least one of the plurality of refrigeration components.

The controller 50 determines the power required for certain refrigeration operations and determines if electrical power from the battery 62 is sufficient or if electrical power from the refrigeration system engine 58 is needed as an alternative or as a supplement to the battery 62. For example, the controller 50 may determine that the power requirement for a full "pulldown" operation that brings the cargo compartment 40 of the trailer 24 from an ambient temperature to a desired set point exceeds the power available from the battery 62 alone. In that case, the refrigeration system engine 58 may be used alone to perform the operation or may work in conjunction with the battery 62. However, other operations such as simply maintaining a set point temperature may have a power requirement that does not exceed the power available from the battery 62. In that case, the battery 62 solely provides the power for the system and the refrigeration system engine 58 may be switched to a non-operational condition. This overall operation results in less fuel being required and may even reduce the required size of the engine 58.

In another embodiment, the battery 62 provides sufficient electrical power for all contemplated operations of the refrigeration system. In such an embodiment, the refrigeration system engine 58 may be eliminated. Therefore, all electrical power required by the refrigeration system is provided with the total available output of the battery 62 which is a combination of the stored power in the battery and that supplemented by the supplemental power source(s).

The combination of power from multiple power sources is facilitated by the AC-to-DC-to-AC power conversion described above. The AC-DC-AC architecture allows for reduced fuel consumption by allowing for a smaller engine, or no engine.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., a processor, apparatus or system) to perform one or more methodological acts as described herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. A hybrid power conversion system for an air conditioned transport vehicle comprising:
   a plurality of refrigeration components for heating and/or cooling a refrigerated volume;
   a battery storing electrical power to be provided to at least one of the plurality of refrigeration components;
   at least one supplemental power source providing electrical power, wherein the at least one supplemental power source comprises a fuel cell pack;
   a charger to combine the electrical power provided by the at least one supplemental power source and provide a combined DC output to the battery to provide a total available DC power for the refrigeration components; and
   a power converter converting the total available DC power to a total AC power, the total AC power provided to at least one of the plurality of refrigeration components;
   wherein the battery provides all the electrical power required for all operations of the at least one of the plurality of refrigeration components and the hybrid power conversion system does not include a refrigeration system engine.

2. The hybrid power conversion system of claim 1, wherein the at least one supplemental power source comprises a solar panel.

3. The hybrid power conversion system of claim 1, wherein the at least one supplemental power source comprises at least one of a regenerative braking system and a wheel hub generator system.

4. The hybrid power conversion system of claim 1, wherein the at least one supplemental power source comprises a generator operatively coupled to an engine of a tractor towing the refrigerated transport vehicle.

5. The hybrid power conversion system of claim 1, wherein the power converter comprises at least one of a power inverter, a motor drive and a motor controller.

6. The hybrid power conversion system of claim 1, wherein the at least one supplemental power source is mounted to an exterior surface of a tractor or a trailer of the transport vehicle, the at least one supplemental power source distanced from the transport refrigeration unit mounted to the trailer.

7. A method of operating an air conditioned system of a transport vehicle comprising:
   providing electrical power to at least one of a plurality of refrigeration components with a battery, the battery configured to output a total DC power;
   providing supplemental electrical power with at least one supplemental power source, the electrical power provided by at least one supplemental power source combined by a charger and routed to the battery to be part of the total DC power, wherein the at least one supplemental power source comprises a fuel cell pack;
   converting, by a power converter, the total DC power to a total AC power; and routing the total AC power to the at least one refrigeration component;

wherein the power required for all operations of the plurality of refrigeration components does not require power provided by a refrigeration system engine.

8. The method of claim 7, wherein the at least one supplemental power source comprises at least one of a solar panel, a regenerative braking system, a wheel hub generator, a fuel cell pack and a generator operatively coupled to an engine of a tractor towing the refrigerated transport vehicle.

9. The method of claim 8, wherein the at least one supplemental power source is the wheel hub generator, the method comprising:

disabling or enabling the wheel hub generator; and using the wheel hub generator to assist vehicle braking.

10. A hybrid power conversion system for an air conditioned transport vehicle comprising:

a plurality of refrigeration components for heating and/or cooling a refrigerated volume;

a battery storing electrical power to be provided to at least one of the plurality of refrigeration components;

at least two supplemental power sources providing electrical power;

a charger to combine the electrical power provided by the at least two supplemental power sources and provide a combined DC output to the battery to provide a total available DC power for the refrigeration components; and a power converter converting the total available DC power to a total AC power, the total AC power provided to at least one of the plurality of refrigeration components;

wherein the battery provides all the electrical power required for all operations of the at least one of the plurality of refrigeration components and the hybrid power conversion system does not include a refrigeration system engine.

11. The hybrid power conversion system of claim 10, wherein the at least two supplemental power sources comprises a fuel cell pack.

12. The hybrid power conversion system of claim 11, wherein the at least two supplemental power sources comprises at least one of a regenerative brake assembly, a solar panel structure and a generator.

* * * * *